(12) United States Patent
Urushi

(10) Patent No.: US 7,124,138 B2
(45) Date of Patent: Oct. 17, 2006

(54) METHOD OF TREATING LONG FILE NAME

(75) Inventor: Takahiro Urushi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 427 days.

(21) Appl. No.: 10/464,652

(22) Filed: Jun. 19, 2003

(65) Prior Publication Data

US 2004/0158547 A1 Aug. 12, 2004

(30) Foreign Application Priority Data

Dec. 5, 2002 (JP) ............... 2002-353164

(51) Int. Cl.
*G06F 17/30* (2006.01)
(52) U.S. Cl. ..................... 707/100; 707/205
(58) Field of Classification Search ............... 707/100, 707/200, 1, 205
See application file for complete search history.

(56) References Cited

U.S. PATENT DOCUMENTS

| 5,745,752 | A | * | 4/1998 | Hurvig et al. ............... 707/200 |
| 5,745,902 | A | * | 4/1998 | Miller et al. ................ 707/200 |
| 5,765,169 | A | * | 6/1998 | Conner ....................... 707/200 |
| 6,286,013 | B1 | * | 9/2001 | Reynolds et al. ........... 707/200 |

* cited by examiner

*Primary Examiner*—Greta Robinson
*Assistant Examiner*—Cheryl Lewis
(74) *Attorney, Agent, or Firm*—Volentine Francos & Whitt, PLLC

(57) ABSTRACT

Long file names found in an application program are contained in array. Then, short file name corresponding to each long file name is made; by combining the number of array element containing the corresponding long file name, with prescribed letter row. On the other hand, in the occasion of comparing newly found long file name with long file names already contained in array, only a specific byte of array element in array is compared with a specific data. Thus, efficient array searching is processed.

12 Claims, 4 Drawing Sheets

| ARRAY If2s | LONG FILE NAME | SHORT FILE NAME |
|---|---|---|
| 1 | LongFileName__1 | s01. dat |
| 2 | LongFileName__2 | s02. dat |
| 3 | LongFileName__3 | s03. dat |
| ⋮ | ⋮ | ⋮ |
| n | LongFileName__n | sn. dat |
| ⋮ | ⋮ | ⋮ |

Fig.2

| ARRAY lf2s | LONG FILE NAME | SHORT FILE NAME |
|---|---|---|
| 1 | LongFileName_1 | s01.dat |
| 2 | LongFileName_2 | s02.dat |
| 3 | LongFileName_3 | s03.dat |
| ......... | ......... | ......... |
| n | LongFileName_n | sn.dat |
| ......... | ......... | ......... |

Fig. 3

| ARRAY NUMBER | CONTAINING REGION OF LONG FILE NAME (256 BYTES) | | | | | | | | | | CONTAINING ITEM |
|---|---|---|---|---|---|---|---|---|---|---|---|
| 1 | 0x46 | 0x69 | 0x6c | 0x65 | 0x31 | 0x00 | 0x00 | ······ | 0x00 | 0x00 | NAME 1 CONTAINED |
| 2 | 0x46 | 0x69 | 0x6c | 0x65 | 0x32 | 0x00 | 0x00 | ······ | 0x00 | 0x00 | NAME 2 CONTAINED |
| 3 | 0xE5 | 0x00 | 0x00 | 0x00 | 0x00 | 0x00 | 0x00 | ······ | 0x00 | 0x00 | DELETED REGION |
| ········ | | | | | | | | ········ | | | |
| K | 0x46 | 0x69 | 0x6c | 0x65 | 0x4B | 0x00 | 0x00 | ······ | 0x00 | 0x00 | NAME K CONTAINED |
| K+1 | 0x00 | 0x00 | 0x00 | 0x00 | 0x00 | 0x00 | 0x00 | ······ | 0x00 | 0x00 | UNOCCUPIED REGION |
| ········ | | | | | | | | | | | UNOCCUPIED REGION |

↑ FIRST BYTE

METHOD OF TREATING LONG FILE NAME

BACKGROUND OF THE INVENTION

1. Field of the Invention

The present invention relates to a method of treating long life name; which is processed, in the occasion when long file name not supported in the file system is used in an application program.

2. Description of the Related Art

In file managing system of Operating System for personal computer, the file name had been made up of 8+3 letter set, for reasons of history of Operating System. That is, in such system, a file name is represented with 8 letters of alphabet or number, a period, and 3 letters of alphabet or number. An example of this is "filename.ext". This kind of file name representing formula is an international standard of ISO 9660 level 1.

By the way, as time has past, new types of Operating Systems are developed by each manufacturer. And, they have grown up in each family of operating system. In this growing process, file names obey 8+3 letter set formula of international standard, in either of these Operating Systems. But, in Operating Systems of some manufacturers, file names are not limited to 8+3 letter set. And, any formula of file names can be used by programmers, from the beginning of the OS development. A file name of this kind is called a long file name. On the other hand, a file name of 8+3 letter set representing formula is called "a short file name", in this application.

On the contrary, in Operating Systems of some other manufacturers, long file names cannot be used at the beginning. That is, only, short file names are supported in systems, in the early time of OS. And, long file names are supported only in the recently developed OS.

Therefore, recently, long file names become to be able to be used in most of operating systems. On the other hand, there can be some personal computers installing some Operating System, which is made in the earliest time. In that occasion, short file names can only be used. But, short file names have already become names of the past, in business world. And, users make application programs, putting aside file names formula. That is, long file names described in this specification, is used. So, in the occasion mentioned above, it becomes necessary to transform long file names into short file names. Therefore, the conventional transforming method will be described.

In the conventional method, long file names are transformed into short file names of 8+3 letter set, according to the regulations hereafter described.
1. An extension character etc. is transformed into underscore "_".
2. The first three letters after period comprise an extension.
3. Spaces are ignored.
4. The first six letters are remained. And, they are transformed into capital letters.
5. The rest two letters are a combination of a tilda "~" and a number. The first combination is "~1". If there are two file names which first six letters are same, the second file name is attached with "~2". If there are ten file names which first six letters are same, the tenth file name is attached with "~10". And, the letter combination becomes that of the first five letters and this attachment.

However, there was the next problem in conventional technique mentioned above.

As mentioned above, when a long file name is newly used in an application program by a programmer, there can be an occasion when already used is a long file name which first six letters are same as those of the newly-used file name. In this occasion, as mentioned above, they are discriminated by attaching "~1" and "~2".

Therefore, if a new long file name is detected in the occasion when an application program is compiled, it is necessary to search all the long file name which are registered in the file managing system, as to judge whether the first six letters are same or not. Otherwise, it cannot be transformed into a short file name. Such searching process must be performed each time when a new long file name is detected.

Therefore, much time is needed to compile an application program. And, there was a problem that developing a program cannot be performed smoothly.

SUMMARY OF THE INVENTION

The present invention adopts the next method to solve the problem mentioned above.

One aspect of this method is that long file name detected in a program, are contained in array. Then, the array element number of the array containing the long file name is combined with a prescribed letter row voluntarily selected by file managing system. And, a short file name is made of this combination, corresponding to the long file name which is contained in the array element of this array element number. Thus, regardless of letter row, which comprises long file name, a short file name is made. And, this short file name is contained corresponding to said array element, as to treat the long file name by this short file name.

According to one aspect.of the present invention, whichever letter row is the long file name, a short file name is made corresponding to it. Thus, searching of long file names for detecting short file names duplication, can be omitted. Therefore, the work load of file managing system which treats file names, can be relieved. As a result, process time of compiling etc. can be shortened. And, developing an application program can be performed smoothly.

The other aspect of the present invention provides a method of searching long file names contained in array. In this method, only a specific byte of each array element is compared with a specific data, in the occasion when a long file name detected is compared with long file names contained in array. And, the next array element is examined immediately after judging that the specific byte is the specific data. On the other hand, in the occasion when the specific byte is not the specific data, said long file name detected is compared with the long file name contained in the array element.

According to the other aspect of present invention, searching time of long file names can be shortened. Therefore, the same effects as mentioned above in one aspect of present invention, can be obtained.

BRIEF DESCRIPTION OF THE DRAWINGS

FIG. 2 shows a structure of table containing short file names corresponding to long file names.

FIG. 3 shows data structure of long file name according to present invention.

DETAILED DESCRIPTION OF THE PREFERRED EMBODIMENTS

Figure 1:
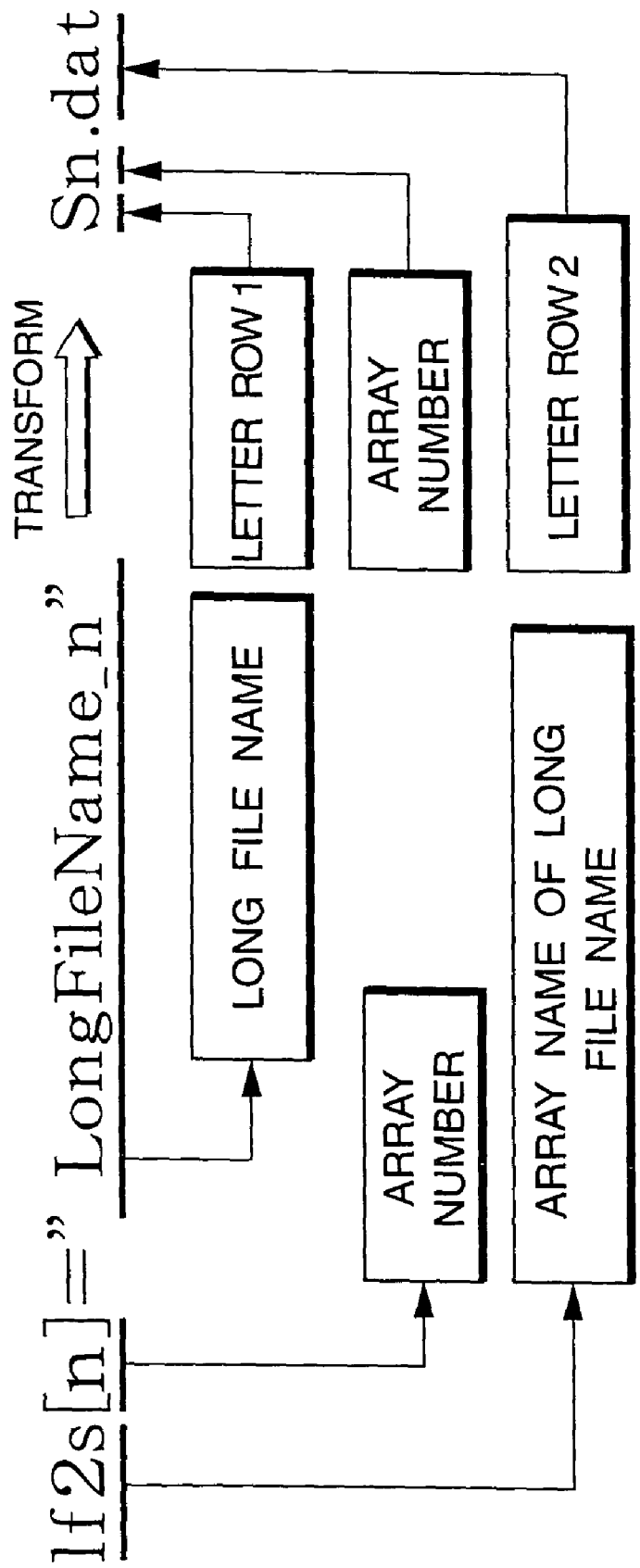
FIG. 1 shows a making process of a short file name according to the present invention.

Hereafter, preferable embodiments of present invention are described, referring to the drawings.

<Embodiment 1>

FIG. 1 shows a making process of short file name according to the method of treating long file name of present invention.

In FIG. 1, array lf2s is a list of long file name. Long file names written in an application program, are detected by a compiler etc. when the application program is compiled. And, detected long file name is contained in array lf2s as a list.

For each element of array lf2s, for example, 256 bytes are allotted. So, a long file name comprises letter row of less than or equal to 255 letters. These letters are alphabet, number or space. If a long file name comprises less than 255 letters, the unoccupied region contains "00" in hexa-decimal.

Hereafter, described is a making process of a short file name.

According to present invention, the array number "n" of array lf2s is used as a component letter of a short file name as it is. That is, this array number "n" is combined with letter row, which is prescribed voluntarily in system.

In Embodiment shown in FIG. 1, as this letter row, used are a voluntary letter row 1 of a first letter row which is combined to the left side of array number and a voluntary letter row 2 of a second letter row which is combined to the right side of array number. As an example of voluntary letter row 1, "s" is used. This is allotted to 8 letters' portion of 8+3 letter set. Moreover, as an example of voluntary letter row 2, ".dat" is used. Thus, a short file name sn.dat of 8+3 letter set is made. Incidentally, the voluntary letter row 2 is not limited to a period (.) and extension. The reason is that any short file name can be used, as far as an application program can recognize it, in the memory region which is necessary for the application program. However, it is preferable to adopt 8+3 letter set according to tradition.

Moreover, only one of either voluntary letter row 1 or voluntary letter row 2, may be used, as a component letter row of such a short file name.

On the other hand, the array number "n" can have more than two places. In such occasion, the voluntary letter row 1 becomes less than or equal to six letters.

Further, the array is not limited to one dimension array, but it can be an array of more than one dimension. In such occasion, each array element number is allotted places of more than one. And, the number of two or more places become component letters of a short file name. To use such array, is quite same as to use an array of one dimension.

On the other hand, as for array itself, if the long file names are already contained in prescribed array lf2s at the starting step of making a short file name, the array element number "n" of the array lf2s can be used. Moreover, as a voluntary letter row 1, the array name lf2s of the long file name can be used, as it is.

Contrary to this, if the long file names are not yet contained in prescribed array lf2s at the starting step of making a short file name, it can be made as follows. The array where long file names are going to be contained, is named a voluntary letter row 1 (s). And, a short file name is made with the array element number "n". This array element number "n" is counted up from one or zero, as plural long file names are given corresponding short file names respectively. Meantime, the long file names are able to be contained in the array s [n].

As mentioned above, according to present invention, whatever the long file name is, a short file name is able to be made.

FIG. 2 shows the correspondence of short file names, which are made according present invention, with long file names.

The short file name corresponding to a long file name contained in an element of array lf2s of array element number "n", is made into "sn.dat". On the other hand, the long file name contained in an element of array lf2s of array element number "n", is not need to be "Long File Name_n" shown in FIG. 2. It can be whichever name.

As a result, contrary to the conventional art, short file names are never duplicated. So, any check of short file names to avoid such duplication, is not needed.

On the other hand, as for long file names, in the occasion when each of them is contained in array, it is necessary to check whether it is not duplicated with other long file names already contained in array.

Meanwhile, according to present invention, as means to solve the problem of how to shorten compiling time, also provided is a method of containing and searching long file names.

Hereafter, an embodiment of this method is described.

<Embodiment 2>

Embodiment 2 relates to a data structure of long file names.

FIG. 3 shows an example of a data structure of long file names.

In FIG. 3, an area of 256 bytes is allotted to the region for containing long file names corresponding to the array element number.

In Embodiment 2, a specific meaning is given to the first byte of this containing region. The content of this region is discriminated by this first byte; whether it is "00", "E5" in hexa-decimal or others.

Meanwhile, the whole region in arrays is initialized with "00" in advance. Therefore, the fact that the first byte is "00", means any long file name is not contained there.

Moreover, in Embodiment 2, as a principle, the containing regions are allotted to long file names in increasing order of the array element number. Therefore, as a result of searching, when array element which first byte is "00" comes, it means that the array element is not yet occupied by any data, besides, all the array element thereafter is not yet occupied by any data. Therefore, by this way, at that time, it can be judged that any more searching is not needed.

Therefore, as a first method of containing a long file name, able to adopt is a method of containing the long file name immediately in an array element which first byte is "00", when each first byte only is compared with "00" from the top array element.

Incidentally, as for the specific byte in each array element where the specific meaning is given, even if other byte than the first byte is used, the usage is included in the scope of present invention. Moreover, as an initializing data, other value than "00" can be used as a matter of course.

On the other hand, in FIG. 3, the fact that the first byte of each array element is "E5", it means; that the long file name contained there, is deleted for some reasons. Therefore, in the course of searching process, when an array element which first byte is "E5" comes, it is not necessary to compare long file names as for this array element. Moreover, at this time, if a new file name is going to be contained, it can be immediately contained in that array element.

Therefore, as a second method of containing a long file name, able to adopt is a method of containing a long file name immediately in an array element which first byte corresponds to "E5", when only the first byte in each array element is compared with "E5" from the top array element.

Incidentally, as for the specific byte given the specific meaning, even if other byte than the first byte is used, the way of using byte is included in the scope of present invention. Moreover, as for invalidating data, other value than "E5" can be used as a matter of course.

However, in traditional file managing system where short file names of 8+3 letter set were used, the occasion when the first byte is "E5" meant that the long file name was deleted.

Therefore, Embodiment 2 obeys this tradition. The fact that the first byte in an array element is "E5" means that; the long file name ever contained there, is deleted.

Figure 4:
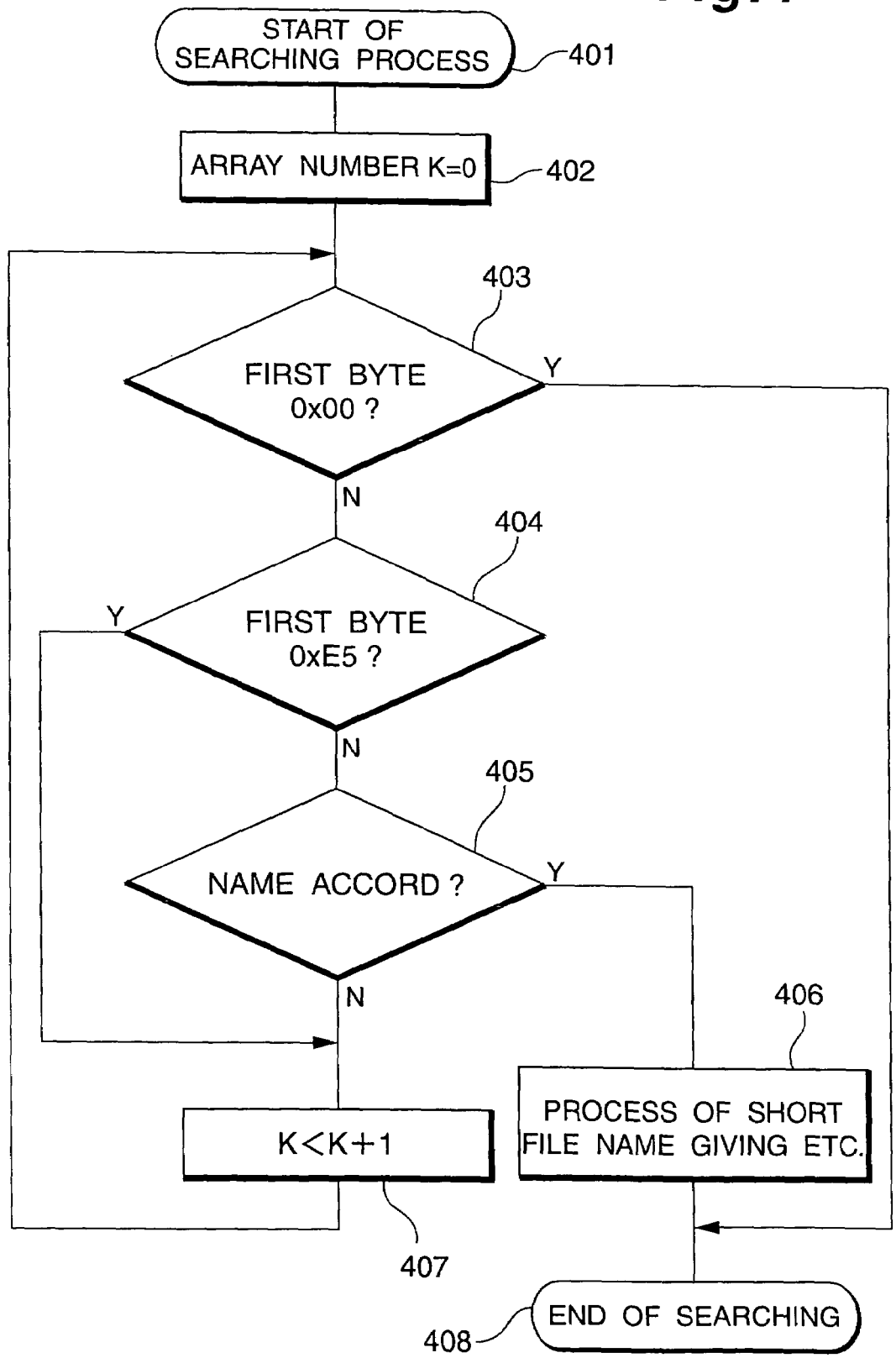
FIG. 4 is a flowchart showing searching process of long file name according to present invention.

On the other hand, an example of process of searching when an application program performs searching long file names, is shown in FIG. 4.

In FIG. 4, when the searching process started (step S401), the program starts searching with the top array element (step S402). At first, the first byte is examined to judge whether it is "00" in hexa-decimal (step S403). If it is true, the examination itself is finished (step S408), because there is not any data to be examined.

If the first byte is not "00", then, as next, the first byte is examined to judge whether it is "E5" or not (step S404). If the first byte is "E5", it means that the file name has been deleted. So, the process goes to the next step of examining next array element (step S407). In the occasion when the first byte is the other data, for the first time, the long file name of examining subject is compared with the long file name contained in the array element (step S405). And, if the two names do not accord with each other, the process goes to examination of next array element (step S407). If the two names accord with each other, performed is the process of making a short file name etc. (step S406). Then, the examination process is finished (step S408).

Incidentally, in examination process mentioned above, as an initializing data and an invalidating data, other data than "00" and "E5" can be used, as same as mentioned above. Moreover, other byte than the first byte can be used, as same as mentioned above. Besides, even in the occasion when only one of these initializing data or invalidating data should be used for the examination, the object of present invention is achieved with a sufficient effect.

Finally, Embodiment 1 and 2 mentioned above are preferably made at the same time. However, even if only one of Embodiment 1 or 2 should be made, the object of present invention is achieved with a sufficient effect.

What is claimed is:

1. A computer implemented method of storing and retrieving data of an array, comprising:

allocating array elements of the array as each having spaces for plural bytes and a space for a specific byte;

initializing the array so that a first data is written into the space for a specific byte of each of the array elements;

sequentially storing respective long file names into the space for a specific byte and the spaces for plural bytes of the array elements;

setting short file names in the array for each of the stored long file names;

deleting a long file name stored in a corresponding array element of the array;

writing a second data into the space for a specific byte of the corresponding array element; and sequentially accessing the array elements by first detecting content of the space for a specific byte of an accessed array element and then detecting content of the spaces for plural bytes of the accessed array element, such that when the space for the specific byte of the accessed array element contains the second data, detection of the content of the spaces for plural bytes of the accessed array element is not performed and accessing of a next array element is carried out, and when the space for the specific byte of the accessed array element contains the first data, said sequentially accessing the array elements is ended.

2. The method of storing and retrieving data of claim 1, wherein the array elements are one-dimensionally arrayed.

3. The method of storing and retrieving data of claim 2, wherein the space for a specific byte is located at a head position of the array elements.

4. The method of storing and retrieving data of claim 1, wherein the space for a specific byte is located at a head position of the array elements.

5. The method of storing and retrieving data of claim 1, wherein said selling short file names comprises combining an array element number of an array element containing a long file name with a prescribed letter row into a short file name.

6. The method of storing and retrieving data of claim 5, wherein the prescribed letter row comprises a first letter row combined to a left side of the array element number and a second letter row combined to a right side of the array element number.

7. The method storing and retrieving data of claim 1, wherein said setting short file names comprises:

combining an array element number of an array element that contains a long file name found in a program with a prescribed letter row into a short file name corresponding to the long file name; and storing the long file name together with the short file name in an array element at the array element number.

8. The method of storing and retrieving data of claim 7, wherein the letter row comprises a first letter row combined to a left side of the array element number and a second letter row combined to a right side of the array element number.

9. The method of storing and retrieving data of claim 1, wherein the first data is "00" in hexa-decimal.

10. The method of storing and retrieving data of claim 1, wherein the second data is "E5 " in hexa-decimal.

11. The method of storing and retrieving data of claim 1, wherein the first data is one byte of initializing data.

12. The method of storing and retrieving data of claim 1, wherein the second data is one byte of invalidating data.

* * * * *